(12) United States Patent
Minnick

(10) Patent No.: US 11,425,459 B2
(45) Date of Patent: Aug. 23, 2022

(54) SYSTEMS AND METHODS TO GENERATE GUARANTEED ADVERTISEMENT IMPRESSIONS

(71) Applicant: DISH Network L.L.C., Englewood, CO (US)

(72) Inventor: Danny J. Minnick, Castle Rock, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 16/886,455

(22) Filed: May 28, 2020

(65) Prior Publication Data

US 2021/0377597 A1 Dec. 2, 2021

(51) Int. Cl.
*H04N 21/443* (2011.01)
*H04N 21/81* (2011.01)
*H04N 21/422* (2011.01)
*H04N 21/472* (2011.01)

(52) U.S. Cl.
CPC ..... *H04N 21/443* (2013.01); *H04N 21/42204* (2013.01); *H04N 21/47217* (2013.01); *H04N 21/812* (2013.01)

(58) Field of Classification Search
CPC ........... H04N 21/443; H04N 21/42204; H04N 21/47217; H04N 21/812; H01H 9/0235
See application file for complete search history.

(56) References Cited

U.S. PATENT DOCUMENTS

| | | | |
|---|---|---|---|
| 5,983,369 A | 11/1999 | Bakoglu et al. | |
| 5,987,213 A | 11/1999 | Mankovitz et al. | |
| 6,084,628 A | 7/2000 | Sawyer | |
| 6,177,931 B1 | 1/2001 | Alexander et al. | |
| 6,999,990 B1 | 2/2006 | Sullivan et al. | |
| 7,281,034 B1 | 10/2007 | Eyal | |
| 7,899,305 B2 | 3/2011 | White | |
| 8,117,564 B2 | 2/2012 | Woods et al. | |
| 8,281,339 B1 | 10/2012 | Walker et al. | |
| 10,250,917 B1 | 4/2019 | Nijim et al. | |
| 10,693,856 B2 | 6/2020 | Cox, Jr. et al. | |

(Continued)

OTHER PUBLICATIONS

Minnick, Danny J., et al., "Systems and Methods for Playing Media Assets Stored on a Digital Video Recorder," U.S. Appl. No. 16/898,128, filed Jun. 10, 2020, 93 pages.

(Continued)

*Primary Examiner* — Thai Q Tran
*Assistant Examiner* — Jose M Mesa
(74) *Attorney, Agent, or Firm* — Seed IP Law Group LLP (57) ABSTRACT

A computerized system for guaranteed advertisement impressions recognizes an identifier of a media content segment (e.g., an advertisement) to be played before playing of a recorded program as a result of selection of or initiation of playing a recorded program. In some embodiments, the system recognizes an identifier of a media content segment at or during initiation of playing the of the media content segment, or during playback of a media content stream including a recorded program. In in response to the recognition of the identifier, the system ignores (or disables the remote control sending), for a predetermined time period, all commands to skip or fast forward through all or part of the media content segment.

25 Claims, 8 Drawing Sheets

(56) References Cited

U.S. PATENT DOCUMENTS

| | | |
|---|---|---|
| 10,986,414 B1 | 4/2021 | Qureshi et al. |
| 2001/0009548 A1 | 7/2001 | Morris |
| 2001/0049820 A1 | 12/2001 | Barton |
| 2002/0042914 A1 | 4/2002 | Walker et al. |
| 2002/0057893 A1 | 5/2002 | Wood et al. |
| 2002/0066106 A1 | 5/2002 | Kanojia et al. |
| 2002/0078444 A1 | 6/2002 | Krewin et al. |
| 2002/0083439 A1 | 6/2002 | Eldering |
| 2002/0087975 A1 | 7/2002 | Schlack |
| 2002/0100062 A1 | 7/2002 | Lowthert et al. |
| 2002/0124249 A1 | 9/2002 | Shintani et al. |
| 2002/0161739 A1 | 10/2002 | Oh |
| 2002/0174430 A1 | 11/2002 | Ellis et al. |
| 2002/0184639 A1 | 12/2002 | Frost |
| 2003/0110499 A1 | 6/2003 | Knudson et al. |
| 2003/0154128 A1 | 8/2003 | Liga et al. |
| 2004/0158858 A1 | 8/2004 | Paxton et al. |
| 2005/0060229 A1 | 3/2005 | Riedl et al. |
| 2005/0114204 A1 | 5/2005 | Kim et al. |
| 2005/0235319 A1 | 10/2005 | Carpenter et al. |
| 2006/0031262 A1 | 2/2006 | Satoh et al. |
| 2006/0156352 A1 | 7/2006 | Smith et al. |
| 2007/0077028 A1 | 4/2007 | Bodkin et al. |
| 2007/0204310 A1 | 8/2007 | Hua et al. |
| 2008/0127246 A1 | 5/2008 | Sylvain |
| 2009/0031335 A1 | 1/2009 | Hendricks et al. |
| 2009/0106104 A1 | 4/2009 | Upendran et al. |
| 2009/0138907 A1 | 5/2009 | Wiser et al. |
| 2009/0158341 A1 | 6/2009 | Miller |
| 2009/0210899 A1 | 8/2009 | Lawrence-Apfelbaum et al. |
| 2009/0307612 A1 | 12/2009 | Singh et al. |
| 2010/0153885 A1 | 6/2010 | Yates |
| 2010/0161429 A1 | 6/2010 | Mandel |
| 2010/0218030 A1 | 8/2010 | Bhatnagar et al. |
| 2010/0238924 A1 | 9/2010 | Liu |
| 2010/0325657 A1 | 12/2010 | Sellers et al. |
| 2011/0110515 A1 | 5/2011 | Tidwell et al. |
| 2011/0194838 A1 | 8/2011 | Meijer |
| 2011/0238507 A1 | 9/2011 | Ben-Rubi |
| 2011/0249081 A1 | 10/2011 | Kay et al. |
| 2012/0072282 A1 | 3/2012 | Leigh et al. |
| 2012/0096489 A1 | 4/2012 | Shkedi |
| 2012/0110620 A1 | 5/2012 | Kilar et al. |
| 2012/0114302 A1 | 5/2012 | Randall |
| 2012/0172033 A1 | 7/2012 | Hilton |
| 2012/0209961 A1 | 8/2012 | McCoy et al. |
| 2012/0216224 A1 | 8/2012 | Rajagopal et al. |
| 2013/0007799 A1 | 1/2013 | Sandoval |
| 2013/0014171 A1 | 1/2013 | Sansom et al. |
| 2013/0055309 A1 | 2/2013 | Dittus |
| 2013/0179917 A1 | 7/2013 | Gu et al. |
| 2013/0227013 A1 | 8/2013 | Maskatia et al. |
| 2014/0130111 A1 | 5/2014 | Nulty et al. |
| 2014/0259057 A1 | 9/2014 | Lv et al. |
| 2014/0298381 A1 | 10/2014 | Koyama et al. |
| 2014/0329565 A1 | 11/2014 | Mannix et al. |
| 2015/0256581 A1 | 9/2015 | Kolhi et al. |
| 2015/0324832 A1 | 11/2015 | Kaufman |
| 2016/0094600 A1* | 3/2016 | Besehanic ............ H04L 65/4084 709/219 |
| 2016/0219142 A1 | 7/2016 | Brown |
| 2016/0294897 A1 | 10/2016 | Bryant et al. |
| 2017/0064398 A1 | 3/2017 | Ventrapragada et al. |
| 2017/0180448 A1 | 6/2017 | Lewis et al. |
| 2017/0188116 A1* | 6/2017 | Major .............. H04N 21/47217 |
| 2017/0286969 A1 | 10/2017 | Ilagan |
| 2018/0103080 A1 | 4/2018 | Girish et al. |
| 2018/0262809 A1 | 9/2018 | Li |
| 2019/0082226 A1 | 3/2019 | Ramamurthy et al. |
| 2019/0332162 A1 | 10/2019 | Sprenger et al. |
| 2020/0036942 A1 | 1/2020 | Pranger et al. |

OTHER PUBLICATIONS

Percival, Robert F., et al., "Systems and Methods for Using Metadata to Play Media Assets Stored on a Digital Video Recorder," U.S. Appl. No. 16/910,671, filed Jun. 24, 2020, 94 pages.

Yang, Yunfeng et al., "Systems and Methods for Selecting and Restricting Playing of Media Assets Stored on a Digital Video Recorder," U.S. Appl. No. 16/886,412, filed May 28, 2020, 94 pages.

Barbieri, John D., "Systems and Methods for Playing Media Assets Stored on a Digital Video Recorder in Performing Customer Service or Messaging," U.S. Appl. No. 16/890,783, filed Jun. 2, 2020, 92 pages.

Yang, Yunfeng, "Systems and Methods for Playing Media Assets Stored on a Digital Video Recorder Based on a Determined Beginning of a Recorded Program," U.S. Appl. No. 16/897,053, filed Jun. 9, 2020, 94 pages.

Ramkumar, Gowtham Ram, "Systems and Methods for Overlaying Media Assets Stored on a Digital Video Recorder on a Menu or Guide," U.S. Appl. No. 16/886,436, filed May 28, 2020, 92 pages.

Barbifri, John D., et al., "Systems and Methods for Playing Media Assets Stored on a Digital Video Recorder While a Customer Service Representative is Online," U.S. Appl. No. 16/898,136, filed Jun. 10, 2020, 93 pages.

* cited by examiner

SYSTEMS AND METHODS TO GENERATE GUARANTEED ADVERTISEMENT IMPRESSIONS

TECHNICAL FIELD

The present disclosure relates playing advertisements impressions, and in particular to systems and methods to technologically generate guaranteed advertisement impressions.

BRIEF SUMMARY

Television advertisements may be inserted into programming, appear in recorded programs, appear in streaming media, and appear in buffered programming due to pausing of live television broadcasts. In such cases, the viewer may fast forward or skip through the advertisements, rendering them ineffective and preventing an advertisement impression from being created.

The embodiments disclosed herein help solve the above technical problems and improve the technology of electronic media advertising and electronic delivery of such advertising by providing a technical solution that generates a guaranteed advertisement impression, and thereby increases the ability to accurately and efficiently deliver advertisement impressions in digital media presentation systems. In one embodiment, a computerized system for guaranteed advertisement impressions recognizes an identifier of a media content segment (e.g., an advertisement) to be played before playing of a recorded program as a result of selection of or initiation of playing a recorded program. In some embodiments, the system recognizes an identifier of a media content segment at or during initiation of playing the of the media content segment, or during playback of a media content stream including a recorded program. In response to the recognition of the identifier, the system ignores, for a predetermined time period, all commands received from a remote-control device to skip or fast forward through all or part of the media content segment. In some embodiments, the receiving device playing the media content segment additionally or instead transmits a signal to a remote-control device, which disables, for a predetermined time, the fast-forward or skip function.

DETAILED DESCRIPTION

In providing advertisements to consumers, media companies generally determine whether a viewer has seen an advertisement merely by determining if the advertisement was transmitted to the viewer's media device, such as a television, smartphone, computer, etc. However, in order for a media company to be paid for transmitting an advertisement, they must prove that an "advertisement impression" was made when the viewer received the advertisement. In order to prove the advertisement impression was made, a media company may keep track of the time the advertisement is playing on the viewer's device; if the advertisement is viewed for a certain period of time, an advertisement impression is presumed to be made.

This method does not guarantee the viewer actually viewed the advertisement because the viewer may mute their media device, perform other tasks with the device until the advertisement has ended, turn off the screen of their device, etc. Additionally, in the case of stored advertisements to be inserted into programming, recorded programs which already contain advertisements, streaming media including advertisements, and buffered programming including advertisements due to pausing of live television broadcasts, the viewer may fast forward or skip through the advertisements, rendering them ineffective and preventing an advertisement impression from being created.

The embodiments disclosed herein help solve the above technical problems and improve the technology of electronic media advertising and electronic delivery of such advertising by providing a technical solution that generates a guaranteed advertisement impression, and thereby increases the ability to accurately and efficiently deliver advertisement impressions in digital media presentation systems. In one embodiment, a computerized system for guaranteed advertisement impressions receives a program content stream and identifies a specific media content segment. After identifying the media content segment, the system disables at least one function of a remote-control device for a predetermined time period, to guarantee that the viewer cannot skip the media content segment for that time period.

In some embodiments, the program content stream includes a recorded program. In some embodiments, the system includes an advertisement in the program content stream with the recorded program, and identifies at least a portion of the advertisement as the specific media content segment. In some embodiments, the advertisement is included in the program content stream before the recorded program. In some embodiments, the advertisement is a targeted advertisement.

In some embodiments, the system identifies playback of the program content stream has reached an advertisement, and disables at least one function of the remote-control device. In some embodiments, at least one function of the remote-control device is disabled for a predetermined time period. In some embodiments, the predetermined time period is long enough to generate an advertisement impression. In some embodiments, all functions of the remote-control device are disabled.

In some embodiments, at least one function of the remote-control device is disabled by sending signals to the remote-control device instructing it to refuse input from buttons related to the at least one function. In some embodiments, at least one function of the remote-control device is disabled by instructing a receiving device to refuse signals from the remote-control device related to that function of the remote-control device. In some embodiments, at least one function of the remote-control device is disabled by instructing the remote-control device to stop transmitting signals related to the at least one function of the remote-control device.

In the following description, certain specific details are set forth in order to provide a thorough understanding of various disclosed embodiments. However, embodiments may be practiced without one or more of these specific details, or with other methods, components, materials, etc. Well-known structures and methods associated with media content delivery have not been shown or described in detail to avoid unnecessarily obscuring descriptions of the preferred embodiments.

Unless the context requires otherwise, throughout the specification and claims which follow, the word "comprise" and variations thereof, such as, "comprises" and "comprising" are to be construed in an open, inclusive sense, for example "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. The term "or" is generally employed in its sense including "and/or" unless the content clearly dictates otherwise.

The headings and Abstract of the Disclosure provided herein are for convenience only and do not interpret the scope or meaning of the embodiments.

Figure 1:
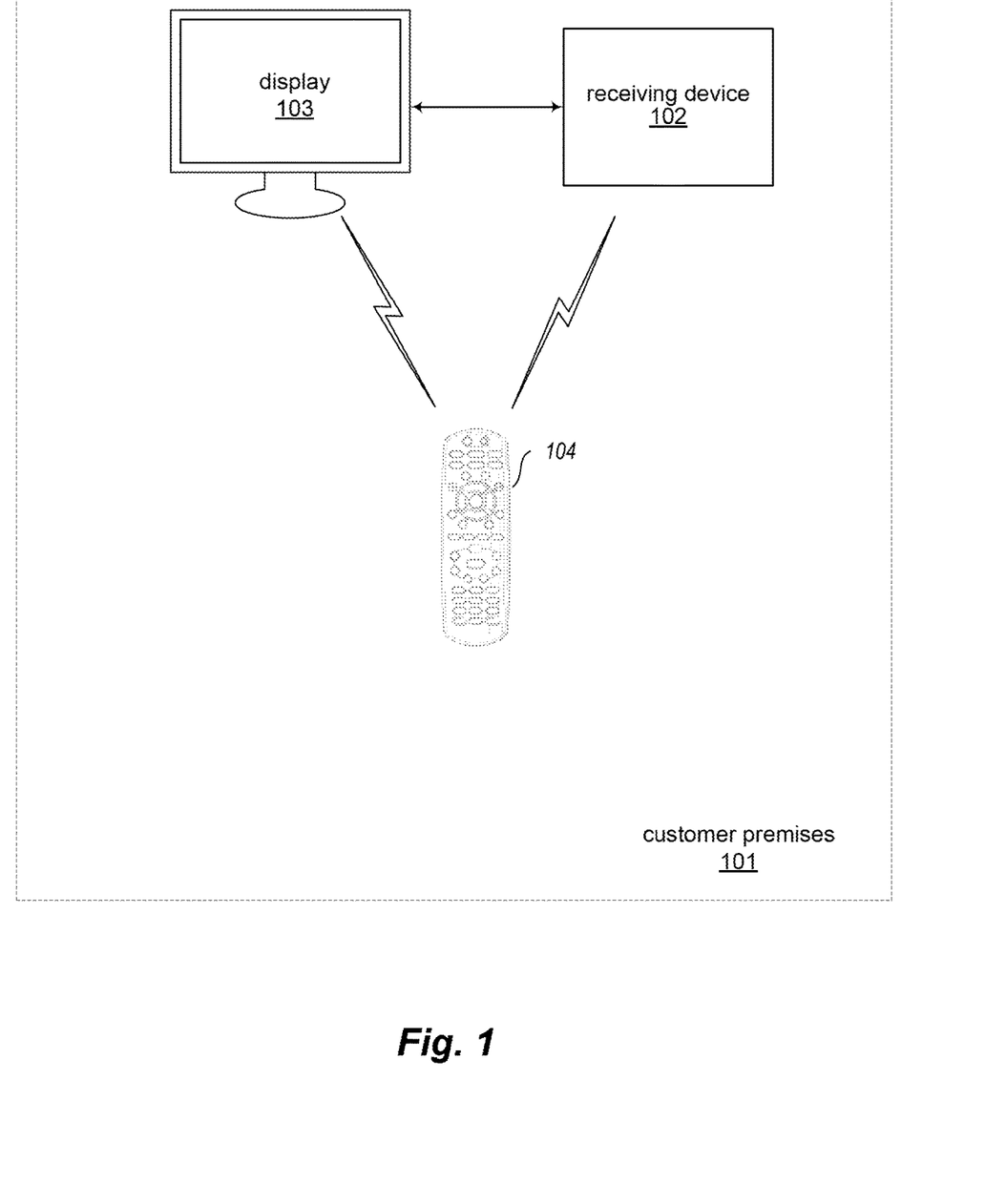
FIG. 1 is a diagram depicting an example environment in which a system to generate guaranteed advertisement impressions may be implemented, according to various embodiments described herein.

FIG. 1 is a diagram depicting an example environment in which a system to generate guaranteed advertisement impressions may be implemented. It is to be appreciated that FIG. 1 illustrates just one example of a customer premises 101 environment and that the various embodiments discussed herein are not limited to the use of such environment. The customer premises 101 can include a variety of communication systems and can use a variety of communication devices, presentation devices and media including, but not limited to, media provided by satellite, cable, and Internet streaming services.

Audio, video, and/or data service providers, such as, but not limited to, television service providers, provide their customers a multitude of audio/video and/or data programming (hereafter, collectively and/or exclusively "programming"). Such programming is often provided by use of a receiving device 102 communicatively coupled to a display 103 configured to receive the programming.

Receiving device 102 may interconnect to one or more communications media or sources, such as a cable head-end, satellite antenna, telephone company switch, Ethernet portal, off-air antenna, or the like, that provide the programming. The receiving device 102 commonly receives a plurality of programming by way of the communications media or other sources. Based upon selection by the user, the receiving device 102 processes and communicates the selected programming to the one or more displays 103.

The receiving device 102 may include devices such as a "television converter," "receiver," "set-top box," "television receiving device," "television receiver," "television recording device," "digital video recorder (DVR)," "satellite set-top box," "satellite receiver," "cable set-top box," "cable receiver," "media player," "Internet streaming device," "television tuner," "media receiver," and/or "media playback device." Accordingly, the receiving device 102 may be any suitable converter device or electronic equipment that is operable to receive and/or play programming. Further, the receiving device 102 may itself include user interface devices, such as buttons, switches and displays. In many applications, a remote-control device 104 is operable to control the display 103 and communicate with the receiving device 102.

Examples of a display 103 include, but are not limited to, a television ("TV"), a personal computer ("PC"), a monitor, a touch screen, a game system, or the like. A display 103 may employ one or more speakers (not shown) and/or other output devices to communicate video and/or audio content to a user (not shown). In many implementations, one or more displays 103 reside in or near a customer's premises 101 and are communicatively coupled, directly or indirectly, to the receiving device 102. Further, the receiving device 102 and the display 103 may be integrated into a single device. Such a single device may have the functionality of the receiving device 102 described herein and the display 103, or may even have additional functionality.

The receiving device 102 may receive a signal from a communications media or source. The receiving device 102 may be a conversion device that converts, also referred to as formatting, the received signal into a signal suitable for communication to a display 103.

The receiving device 102 may receive programming partially from, or entirely from, another source other than that described above. Other embodiments of the receiving device 102 may receive locally broadcast RF signals, or may be coupled to a communications system via any suitable medium. Non-limiting examples of medium communicatively coupling the receiving device 102 to a communications system include cable, fiber optic, or Internet media.

Customer premises 101 may include other devices which are communicatively coupled to the receiving device 102 and/or a communication system via a suitable media. For example, some customer premises 101 include an optional network, communication system or networked system (not shown), to which receiving device 102 and display 103 can be coupled, collectively referred to as endpoint devices. Non-limiting examples of such a network or communication system include, but are not limited to, an Ethernet system, twisted pair Ethernet system, an intranet, a local area network ("LAN") system, short range wireless network (e.g., Bluetooth®), a personal area network (e.g., a Zigbee network based on the IEEE 802.15.4 specification), a Consumer Electronics Control (CEC) communication system or the like. One or more endpoint devices, such as PCs, data storage devices, TVs, game systems, sound system receivers, Internet connection devices, digital subscriber loop ("DSL") devices, wireless LAN, WiFi, Worldwide Interoperability for Microwave Access ("WiMax") devices, or the like, may be communicatively coupled to the network or to each other so that the plurality of endpoint devices are communicatively coupled together. Thus, such a network allows the interconnected endpoint devices, and the receiving device 102, to communicate with each other. Alternatively, or in addition, some devices in the customer premises 101 may be directly connected to the network, such as a telephone which may employ a hardwire connection or an RF signal for coupling to the network, which may also connect to other networks or communications systems outside customer premises 101.

A hand-held remote-control device 104 may provide an interface between the receiving device 102 and a user. Remote-control device 104 typically communicates with the receiving device 102 using a suitable wireless medium, such as infrared ("IR"), radio frequency ("RF"), or the like and may be any wireless handheld device, including a mobile device such as a cellular telephone or a tablet device. Other input or control devices (not shown) may also be communicatively coupled to the receiving device 102. Non-limiting examples include game device controllers, keyboards, touch pads, touch screens, pointing devices and the like. The remote-control device 104 may also control other devices such as the display 103 and/or other endpoint devices (not shown). The remote-control device 104 may be a "universal" remote or otherwise programmable or configurable by a manufacturer, user, and/or other device to control such other devices.

In some embodiments, the remote-control device 104 may be a multibrand remote that comes to the user preprogrammed with the codes to operate a number of standard home electronic devices. Such a remote may be able to control multiple devices and, in some embodiments, control their main functions, such as channel turning, volume control and other functions. The remote-control device 104 may also be a "learning" remote. In particular, while the remote-control device 104 may be preprogrammed to operate a number of popular electronic models, it may also have the ability to learn the functions of the original manufacturer's remote of each device. For example, this may be accomplished by placing the remote-control device 104 head-to-head with the device's original manufacturer's remote and infrared signals will be transmitted to the learning remote that allow it to duplicate the other remote's commands. Such learning can also be accomplished via RF or wired communication between remote-control devices and/or other devices.

In some embodiments, the remote-control device 104 can receive signals from the receiving device 102. In many such embodiments, the remote-control device 104 can also execute instructions contained in the signals received from the receiving device 102. In some embodiments, the remote-control device 104 can disable its own functionality by refusing to send signals related to one or more functions. In some embodiments, remote-control device 104 can disable its own functionality by disabling one or more buttons related to one or more functions.

The above description of the customer premises 101, and the various devices therein, is intended as a broad, non-limiting overview of an example environment in which various embodiments of a system to guarantee advertisement impressions can be implemented. The customer premises 101 and the various devices therein, may contain other devices, systems and/or media not specifically described herein.

Example embodiments described herein provide applications, tools, data structures and other support to implement systems and methods for generating guaranteed advertisement impressions by disabling a remote-control device that may control various media devices. The example embodiments described herein additionally provide applications, tools, data structures and other support to implement systems and methods for generating guaranteed advertisement impressions by selecting media content segments for playback and ignoring commands from a remote-control device that may control various media devices. Other embodiments of the described techniques may be used for other purposes, including for controlling the operation of remote-control devices generally. In the following description, numerous specific details are set forth in order to provide a thorough understanding of the described techniques. The embodiments described also can be practiced without some of the specific details described herein, or with other specific details, such as changes with respect to the ordering of processes or devices, different processes or devices, and the like. Thus, the scope of the techniques and/or functions described are not limited by the particular order, selection, or decomposition of steps described with reference to any particular module, component, or routine.

Figure 2:
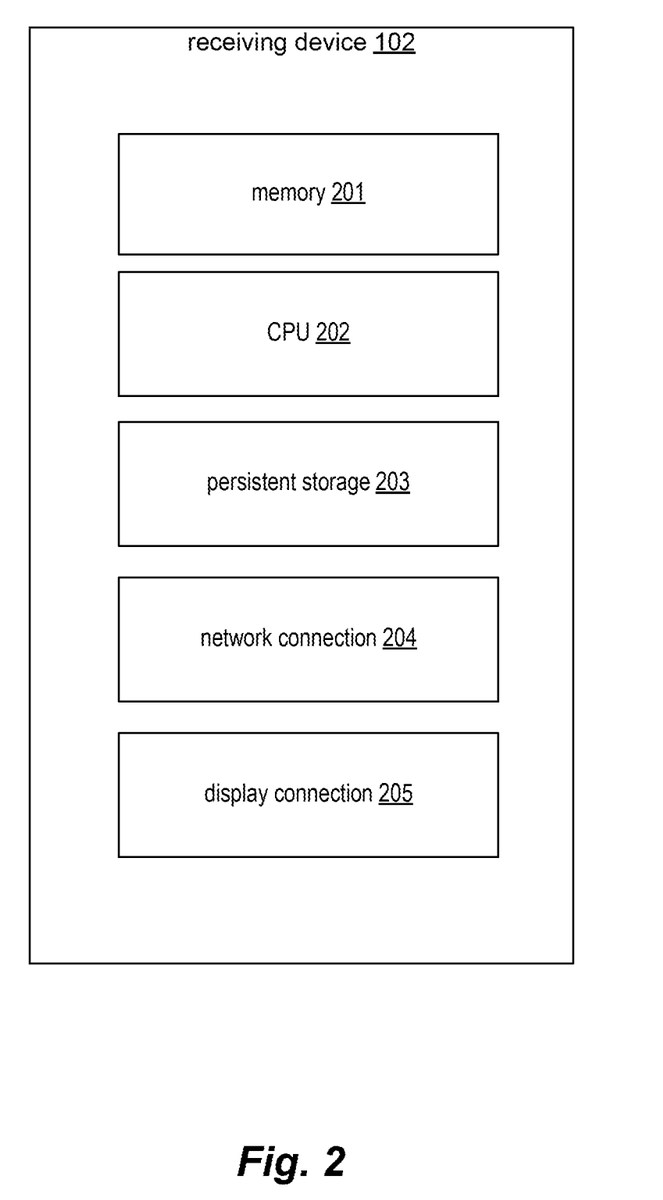
FIG. 2 is a block diagram depicting example components incorporated in a receiving device on which the system to generate guaranteed advertisement impressions operates, according to various embodiments described herein.

FIG. 2 is a block diagram depicting example components incorporated in a receiving device 102 on which the system to generate guaranteed advertisement impressions operates, according to various embodiments described herein. In various embodiments, the receiving device 102 includes one or more of the following: a central processing unit ("CPU") 201 for executing computer programs; a computer memory 202 for storing programs and data while they are being used, including the facility and associated data, an operating system including a kernel, and device drivers; a persistent storage device 203, such as a hard drive or flash drive for persistently storing programs and data; a network connection 204 for connecting the computer system to satellite, cable, and Internet streaming services, remote control devices, such as remote control device 104, and/or other computer systems to send and/or receive data, such as via the Internet or another network and its networking hardware, such as switches, routers, repeaters, electrical cables and optical fibers, light emitters and receivers, radio transmitters and receivers, and the like; and a display connection 205 for causing visual information or data to be displayed, such as on display 103, to a user. While a receiving device 102 configured as described above is typically used to support the operation of the facility, those skilled in the art will appreciate that the facility may be implemented using devices of various types and configurations, and having various components. The memory 201 may have computer-executable instructions stored thereon, that, when executed by the CPU 202, cause the receiving device 102 and/or remote-control device 104 to perform the operations and functions described herein.

Figure 3:
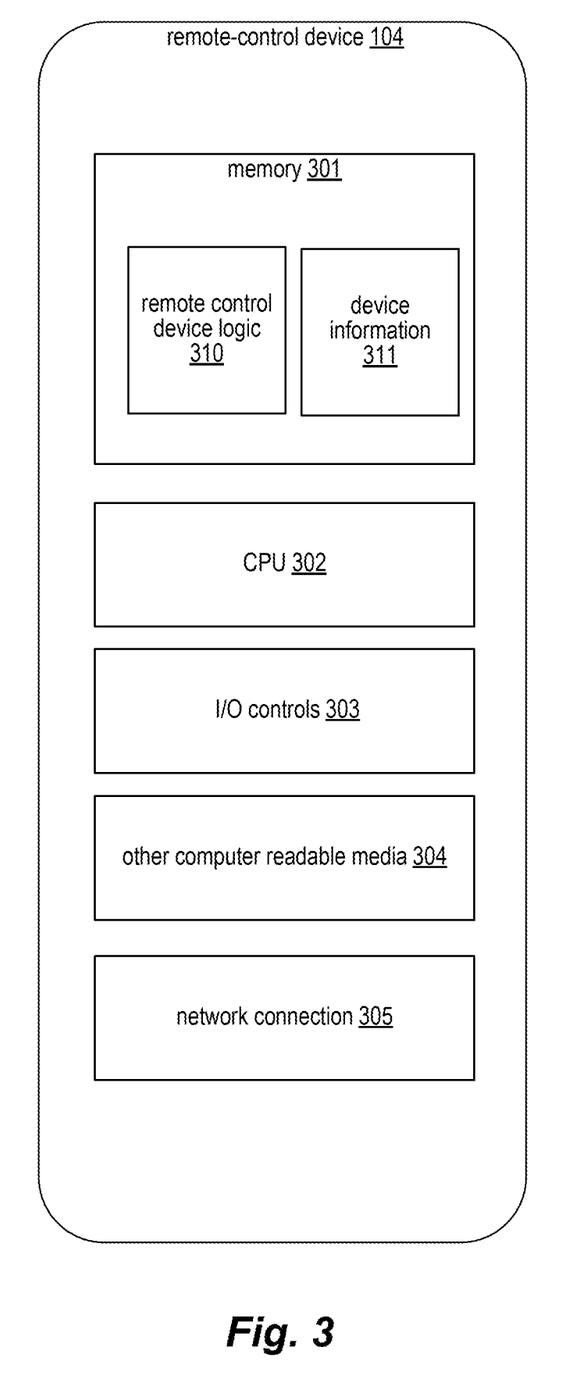
FIG. 3 is a block diagram depicting components of a sample embodiment of a remote-control device for the system to generate guaranteed advertisement impressions, according to various embodiments described herein.

FIG. 3 is a block diagram depicting components of a sample embodiment of a remote-control device 104 for the system to generate guaranteed advertisement impressions. In one embodiment, remote-control device 104 comprises a computer memory ("memory") 301 and one or more Central Processing Units ("CPU") 302. Also included are Input/Output "I/O" controls 303, including, but not limited to: buttons, virtual buttons, switches, keypads, keyboards, touchpads, touchscreens, display screens, liquid crystal displays, speakers, scroll wheel inputs, optical sensors, gesture sensors, accelerometers, motion control sensors, voice command sensors, microphones, track ball's and/or joysticks, etc. The remote-control device 104 may also include other computer-readable media 304 (e.g., flash memory, SIM card) and a network connection 305. For example, the I/O controls 303 may include buttons, although different numbers and configurations of controls exist in various embodiments, including those with touch screen buttons and other input controls. The network connection 305 includes one or more communication interfaces to various media devices, including but not limited to, radio frequency transceivers, infrared transceivers, wireless Ethernet ("Wi-Fi") interfaces, short range wireless (e.g., Bluetooth®) interfaces and the like. The one or more Central Processing Units ("CPU") 302 may be communicatively coupled to the memory 301, the Input/Output controls 303, other computer-readable media 304 and network connection 305, (e.g., via a communications bus) in a manner to control one or more operations of those various components.

The remote-control device 104 may communicate with receiving device 102, display 103, and possibly other media devices, such as via the network connection 305. Example media devices include other remote-control devices, media players, streaming media devices, DVRs, DVD players, video recorders, audio systems, displays, personal computers, set-top boxes, mobile devices and the like.

Remote-control device logic 310 and device information 311 is shown residing in memory 301. In other embodiments, some portion of the device information and some of, or all of, the components of the logic 310 may be stored on the other computer-readable media 304. The logic 310 may include computer-executable instructions stored on the memory that preferably execute on one or more CPUs 302 and manages operation of the remote-control device 104, including causing the remote-control device 104 to perform the operations and functions described herein. The logic 310 may comprise or implement a system control module as executed by one or more CPUs 302 that are communicatively coupled to the I/O controls 303 and other components of the remote-control device 104. Other code or programs and potentially other data/information (not shown), may also reside in the memory 301, and may execute on one or more CPUs 302. Of note, one or more of the components in FIG. 3 may not be present in any specific implementation. For example, some embodiments may not provide other computer readable media 304.

The logic 310 performs the core functions of the remote-control device 104, as discussed herein and also with respect to FIGS. 4 through 8. In particular, the logic 310 reads input that results from activation of I/O controls 303 on the remote-control device 104 by the user and performs the function corresponding to the input, including sending commands to various devices and performing internal operations of the remote-control device 104.

The remote-control device 104 may receive signals at the network connection 305 representing commands to perform operations in the remote-control device 104. These commands can include additional logic regarding the actions taken by remote-control device 104 after activation of certain I/O controls 303, such as preventing the function corresponding to the input from being performed. In some embodiments, the commands can include additional instructions, such as specifying a time period to disable certain functions.

In at least some embodiments, remote and/or programmatic access is provided to at least some of the functionality of the remote-control device 104. For example, the remote-control device 104 may provide to other media devices an application program interface ("API") that provides access to various functions of the remote-control device 104, including access to information stored by the remote-control device 104 such as whether functions of the remote are currently disabled.

In an example embodiment, the logic 310 and/or computer-executable instructions stored on memory 201 of the receiving device 102 are implemented using standard programming techniques. For example, the logic 310 and/or computer-executable instructions stored on memory 201 of the receiving device 102 may be implemented as a "native" executable running on CPU 202 and/or the CPU 302, along with one or more static or dynamic libraries. In other embodiments, the logic 310 and/or computer-executable instructions stored on memory 201 of the receiving device 102 may be implemented as instructions processed by a virtual machine that executes as some other program. In general, a range of programming languages may be employed for implementing such example embodiments, including representative implementations of various programming language paradigms and platforms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, PHP, Python, JavaScript, VBScript, and the like) and declarative (e.g., SQL, Prolog, and the like).

The embodiments described above may also use synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the functions of the remote-control device 104.

In addition, programming interfaces to the data stored as part of the device information 311, can be available by standard mechanisms such as through C, C++, C#, and Java APIs; libraries for accessing files, databases, or other data repositories; through scripting languages such as JavaScript and VBScript; or through Web servers, FTP servers, or other types of servers providing access to stored data. The device information 311 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of the remote-control device 104 and/or receiving device 102.

Furthermore, in some embodiments, some or all of the components/portions of the logic 310 and/or functionality provided by the computer-executable instructions stored on memory 201 of the receiving device 102 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Such computer program products may also take other forms in other embodiments. Accordingly, embodiments of this disclosure may be practiced with other computer system configurations.

Figure 4:
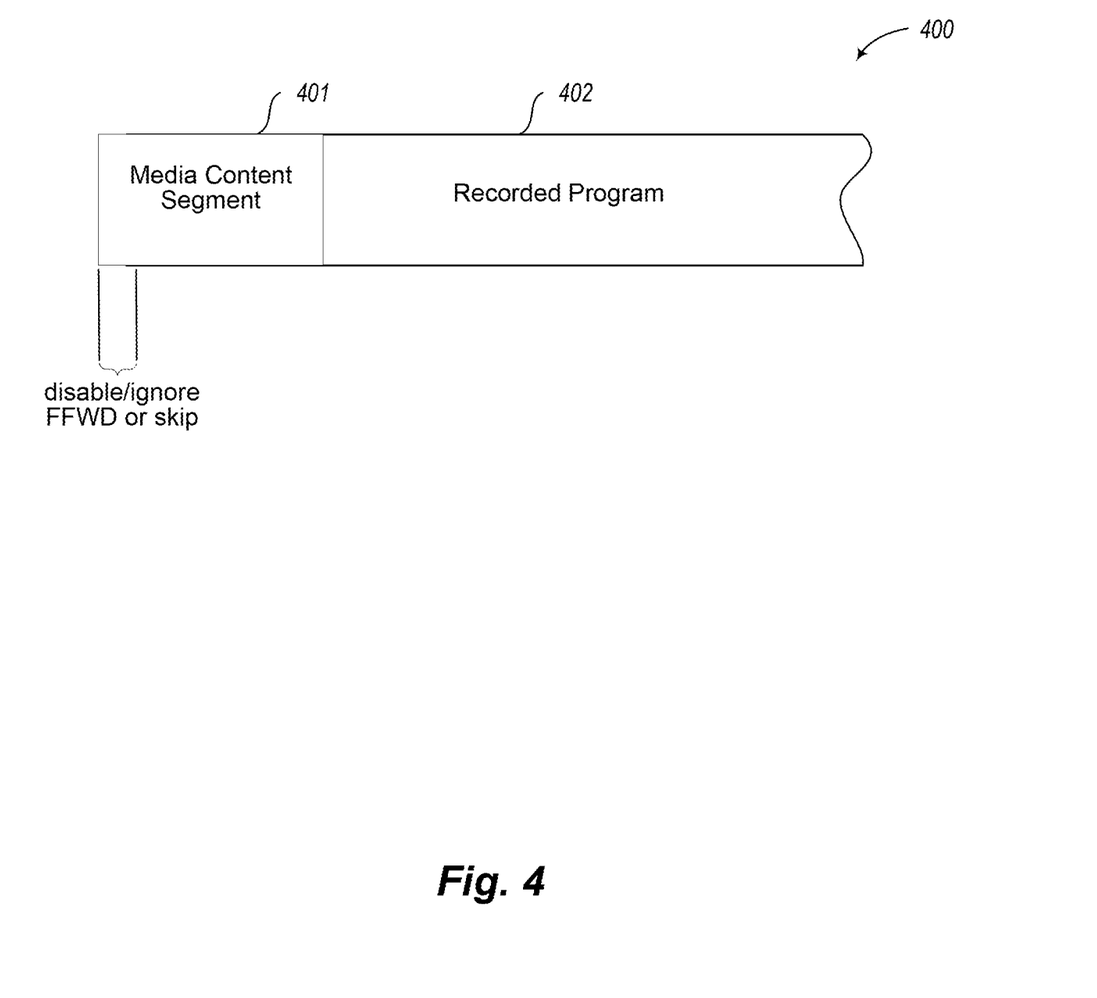
FIG. 4 is a signal diagram of an example program content stream used in the system to generate guaranteed advertisement impressions, according to various embodiments described herein.

FIG. 4 is a signal diagram of an example program content stream 400 used in the system to guarantee advertisement impressions, according to various embodiments described herein. The program content stream 400 includes audio, video, text, etc. data representing media. The program content stream 400 includes a media content segment 401 and a recorded program 402. The receiving device 102 transmits the program content stream 400 to the display 103. The media content segment 401 includes an identifier, which informs the receiving device when playback of the program content stream 400 reaches the media content segment 401. For example, the identifier may include a code, value, name, cue, header, transition indication, presentation time stamp value, metadata and/or other information indicative of the media content segment 401 and/or when the media content segment 401 appears or is to appear in the program content stream 400.

In some embodiments, the media content segment 401 may be a separate file (e.g., an advertisement) stored on the receiving device 102, selected by the receiving device 102 for insertion into the program content stream 400, or selected for playback of the media content segment 401 to occur immediately before playing of the recorded program 402. Such selection of the media content segment 401 may be in response to selection of the recorded program 402 for playing from the beginning of the recorded program 402. Thus, in some embodiments, the identifier may be selection for play and or initiation of play of the media content segment stored on the receiving device 102.

In some embodiments, the media content segment 401 is an advertisement. In some embodiments, the media content segment 401 is a targeted advertisement. In some embodiments, the media content segment 401 is not an advertisement. In some embodiments, the recorded program 402 is stored on the receiving device 102. In some embodiments, the recorded program 402 is received from a source external to the receiving device, such as: another device on the premises, such as a personal computer, smartphone, laptop, personal media server, etc.; the "cloud"; a computer-readable media device, such as a USB drive, CD, DVD, Blu-Ray Disc, etc.; the Internet or any other computer network; etc.

In some embodiments, the receiving device 102 inserts the media content segment 401 into the program content stream 400 before the recorded program 402. In some embodiments, the receiving device 102 inserts the media content segment 401 into the program content stream during the recorded program 402. In some embodiments, the receiving device 102 inserts the media content into the program content stream 400 after the recorded program 402. In some embodiments, a device other than the receiving device 102 inserts the media content segment 401 into the program content stream 400. In some embodiments, the receiving device 102 receives the program content stream 400 from another device, with the media content segment 401 and the recorded program 402 already being included in the program content stream 400.

The receiving device 102 may recognize an identifier of or indication that a media content segment 401 (e.g., an advertisement) is playing or will be played before playing of the recorded program 402 after or as a result of selection of or initiation of playing a recorded program 402 or the media content segment 401. For example, this may be based on media asset metadata stored on the receiving device 102 associated with the media content segment 402, which may have been selected for play based on the selection of or initiation of playing a recorded program 402. In some embodiments, the system recognizes an identifier or indication of the media content segment 401 at or during initiation of playing the of the media content segment 401, or during playback of a media content stream including a recorded program 402. In in response to the recognition of the identifier or indication that a media content segment 401 is playing or will be played before playing of the recorded program 402, the receiving device 102 ignores for a predetermined time period, all commands received from the remote-control device 104 to skip or fast forward through all or part of the media content segment 40. In some embodiments, the receiving device additionally or instead transmits a signal to the remote-control device 104, which disables, for a predetermined time, at least one function of the remote-control device (e.g., the fast-forward or skip function).

Figure 5:
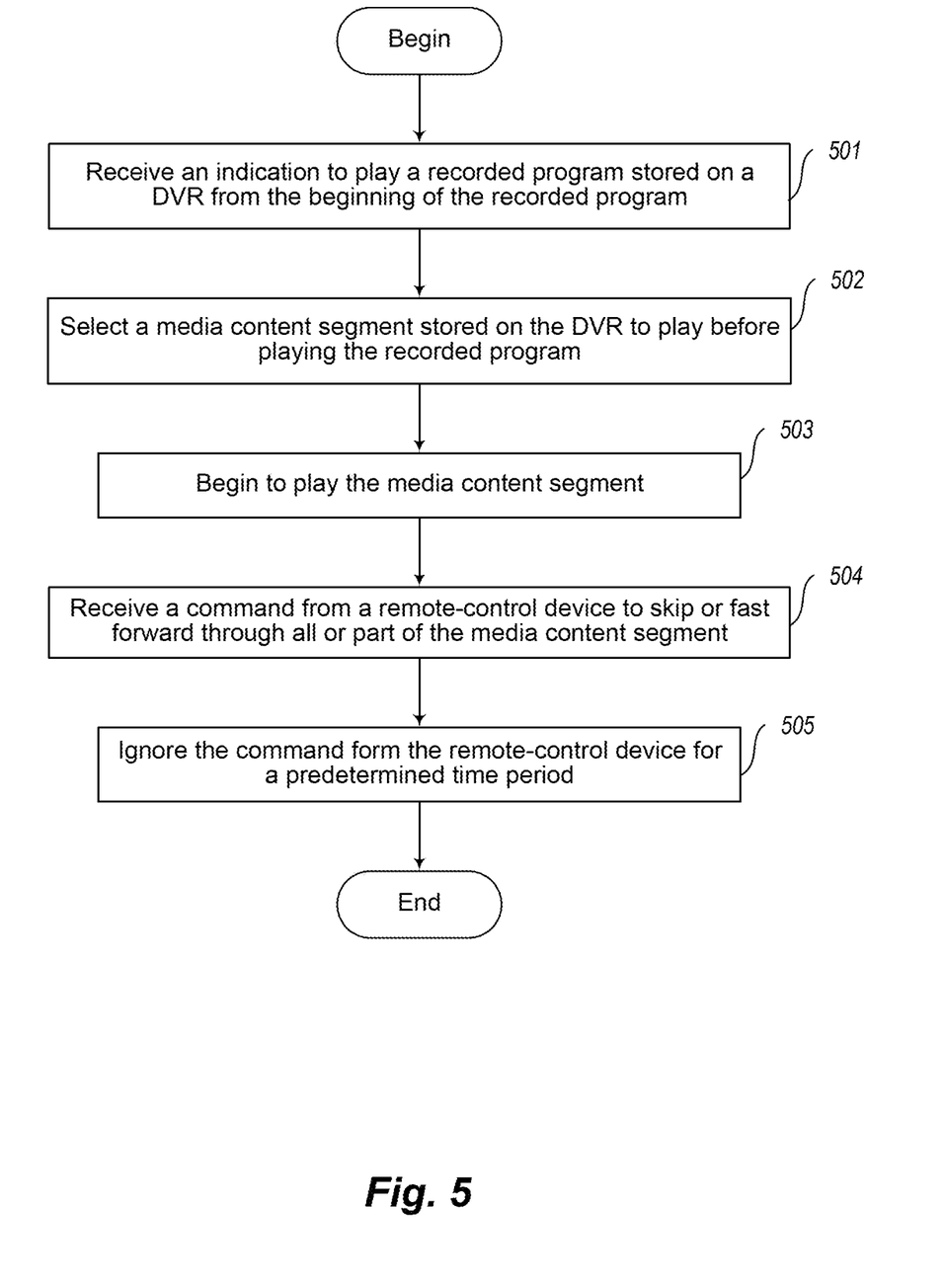
FIG. 5 is a flow diagram of a process to ignore a remote-control device during playback of a media content segment, used by the system to generate guaranteed advertisement impressions according to various embodiments described herein.

FIG. 5 is a flow diagram of a process to ignore a remote-control device during playback of a media content segment, used by the system to generate guaranteed advertisement impressions in some implementations. First, in act 501, the receiving device receives an indication from a user to play a recorded program stored on the receiving device from the beginning of the recorded program. In act 502, the receiving device selects a media content segment stored on the receiving device to play before the recorded program. In some embodiments, the receiving device automatically selects the media content segment from a plurality of media content segments stored on the receiving device.

In act 503, the receiving device begins to play the media content segment on the display. In act 504, the receiving device receives a command from the remote-control device to skip or fast forward through all of part of the media content segment. In act 505, the receiving device ignores the command from the remote-control device for a predetermined time period. The predetermined time period is shorter than the duration of the media content segment. In some embodiments, the receiving device determines the time period in act 505 based on media asset metadata stored on the receiving device associated with the media content segment.

In some embodiments, the media content segment is an advertisement. In some embodiments, the predetermined time period is based on a type of advertisement spot indicated by the media asset metadata stored on the DVR. In some embodiments, the receiving device receives media asset metadata which causes the receiving device to select a media content segment stored on the receiving device from a plurality of media content segments based on the media asset metadata and plays the selected media content segment before playing the recorded program.

In some embodiments, the predetermined time period is one second. In some embodiments, the predetermined time period is based on an order for insertion of the media content segment to occur at the receiving device upon selection of a recorded program stored on the receiving device. In some embodiments, the receiving device selects the media content segment by determining that the media asset metadata includes a service identifier indicating an addressable service of the receiving device and selecting the media content segment and predetermined time period based on a characteristic of the media content segment associated with the service identifier.

Figure 6:
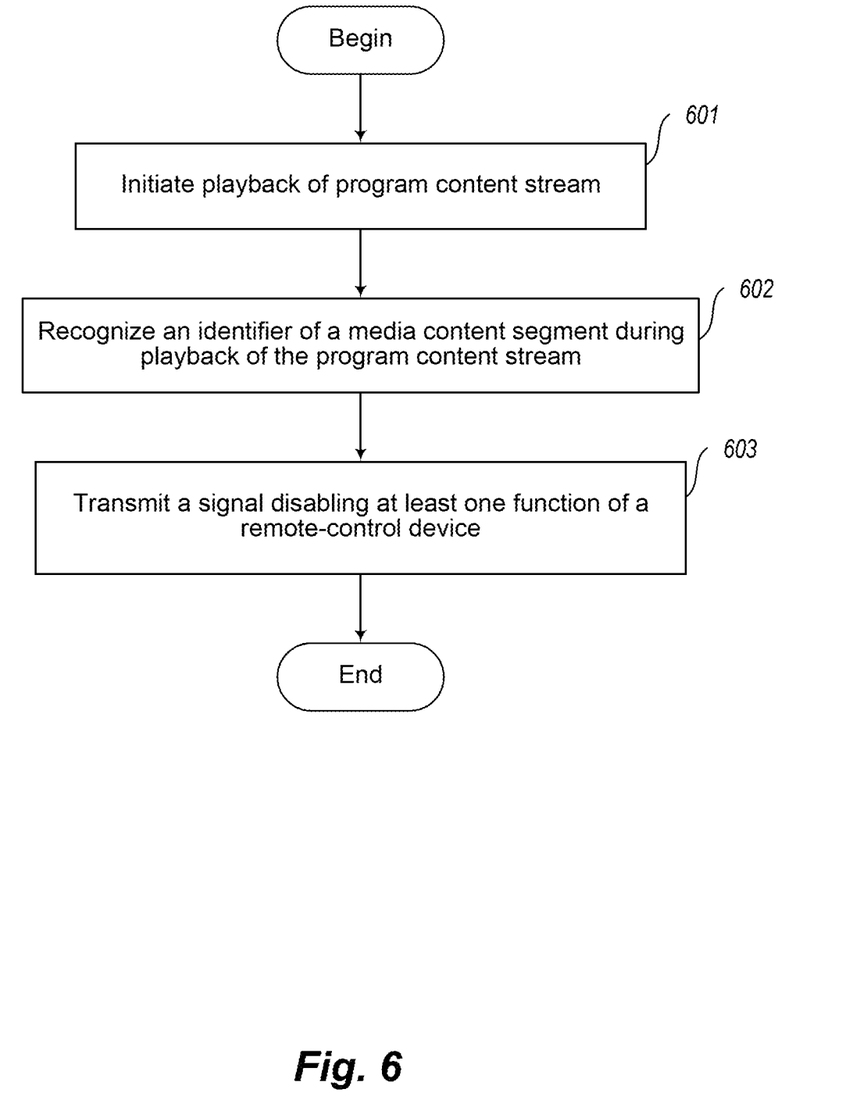
FIG. 6 is a flow diagram of a process to disable a remote-control device during playback of a program content stream, used by the system to generate guaranteed advertisement impressions, according to various embodiments described herein.

FIG. 6 is a flow diagram of a process to disable a remote-control device during playback of a program content stream, used by the system to generate guaranteed advertisement impressions in some implementations. First, in act 601, a receiving device initiates playback of a program content stream. In act 602, the receiving device recognizes an identifier of a media content segment during the playback of the program content stream. In act 603, in response to the recognition of the identifier, the receiving device transmits a signal to a remote-control device which disables at least one function of the remote-control device.

In some embodiments, the remote-control device is disabled for a predetermined time period. In some embodiments, the signal transmitted by the receiving device instructs the remote-control device to ignore input and output related to the at least one function of the remote-control device, thereby disabling that function of the remote-control device. In some embodiments, the signal transmitted by the receiving device instructs the remote-control device to stop transmitting signals related to the at least one function of the remote-control device. In some embodiments, the function disabled by the remote-control device is a fast forward function or a skip function. In some embodiments, the signal transmitted by the receiving device disables all functions of a remote-control device. In some embodiments, the receiving device transmits the signal disabling at least one function of the remote-control device if the media content segment is located before the recorded program in the program content stream. In some embodiments, the receiving device transmits the signal disabling at least one function of the remote-control device if the program content stream includes a recorded program, and playback of the program content stream starts at the beginning of the recorded program.

Figure 7:
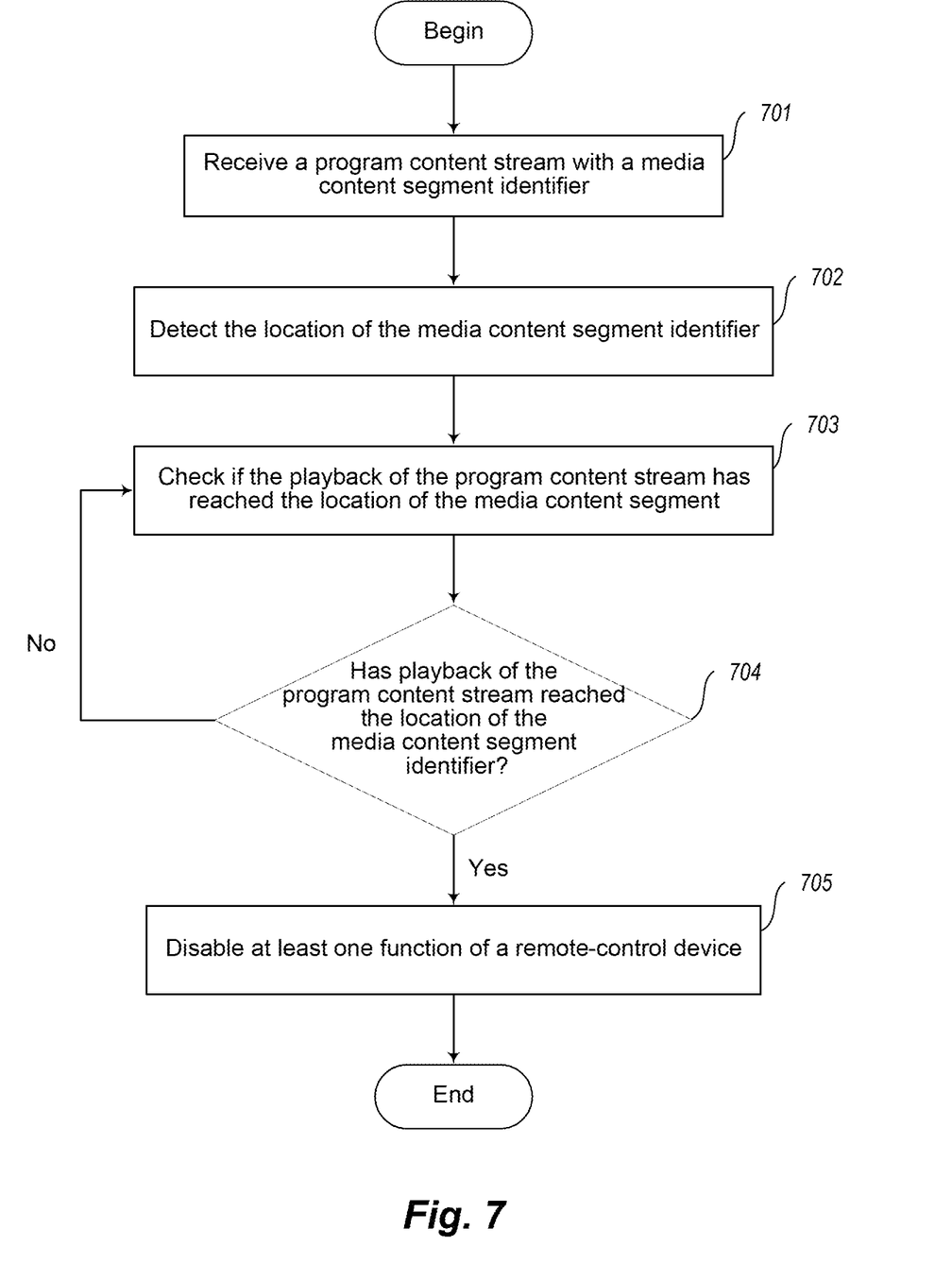
FIG. 7 is a flow diagram of a process to disable a remote-control device by a receiving device, used by the system to generate guaranteed advertisement impressions, according to various embodiments described herein.

FIG. 7 is a flow diagram of a process to disable a remote-control device by a receiving device, used by the system to generate guaranteed advertisement impressions in some implementations. In act 701, the receiving device receives a program content stream containing a media content segment identifier. In act 702, the receiving device detects the location of the media content segment identifier in the program content stream. In act 703, the receiving device determines if the playback of the program content stream has reached the location of the media content segment identifier. At act 704, if playback of the program content stream has reached the location of the media content segment identifier, the process moves to act 705, otherwise it returns to act 703. At act 705, the receiving device disables at least one function of a remote-control device.

In some embodiments, the receiving device determines whether the media content segment identifier indicates the media content segment occurs immediately before a beginning of the recorded program. The receiving device then disables at least one function of the remote-control device, for a predetermined time period, when playback of the program content stream reaches the location of the media content segment identifier, in response to a determination that the media content segment identifier indicates the media content segment occurs immediately before the beginning of the program content stream.

In some embodiments, if the location of the media content segment identifier does not indicate the media content segment occurs immediately before a beginning of the recorded program in the program content stream, the receiving device does not disable the at least one function of the remote-control device. In some embodiments, if the program content stream contains a recorded program, and the playback of the recorded program does not start at the beginning of the recorded program, the receiving device does not disable the at least one function of the remote-control device.

In some embodiments, the at least one function of the remote-control device is disabled for a predetermined time period. In some embodiments, the at least one function of the remote-control device is a fast forward function or a skip function. In some embodiments, all functions of the remote-control device are disabled. In some embodiments, the disabling of the at least one function of the remote-control device is performed by sending a signal from the receiving device to the remote-control device, instructing the remote-control device to disable the at least one function. In some embodiments, the signal instructing the remote-control device to disable at least one function includes instructions for the remote-control device to stop sending signals related to the at least one function. In some embodiments, the receiving device disables the at least one function of the remote-control device by refusing to accept signals from the remote-control device.

Figure 8:
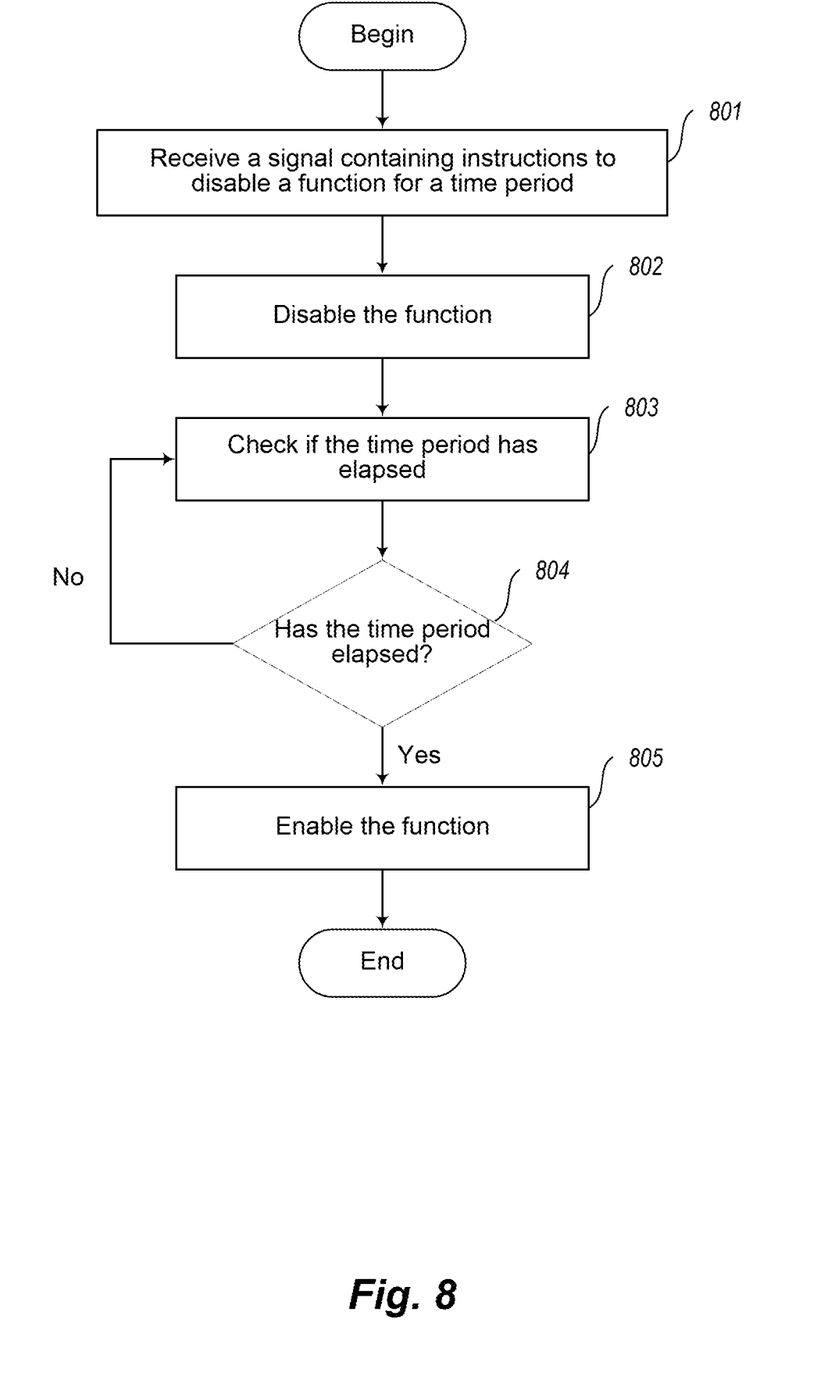
FIG. 8 is a flow diagram of a process to disable a function of a remote-control device, used by the system to generate guaranteed advertisement impressions, according to various embodiments described herein.

FIG. 8 is a flow diagram of a process to disable a function of a remote-control device, used by the system to generate guaranteed advertisement impressions in some implementations. In act 801, a remote-control device receives a signal containing instructions to disable a function of the remote-control device for a period of time. In act 802, the remote-control device disables the function. In some embodiments, the remote-control device disables the function by ignoring signals from input and output related to the function. In some embodiments, the remote-control device disables the function by refusing to transmit signals relating to the function. In some embodiments, the function disabled is a fast forward function or a skip function. In some embodiments, all functions of the remote-control device are disabled.

In act 803, the remote-control device checks if the period of time has elapsed. In act 804, if the period of time has elapsed the process moves to act 805, otherwise it returns to act 803. At act 805, the remote-control device re-enables the at least one function.

In some embodiments, the remote-control device receives the signal in act 801 from a receiving device. In some embodiments, the remote-control device receives the signal after a receiving device encounters a media content segment identifier in a program content stream. In some embodiments, the remote-control device receives the signal after a receiving device determines playback of a program content stream has reached a media content segment. In some embodiments, the remote-control device receives the signal if the receiving device determines the media content segment identifier is located at the beginning of a recorded program included in the program content stream. In some embodiments, the remote-control device receives the signal if the receiving device determines the playback of a recorded program included in the program content stream starts at the beginning of the recorded program.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system for controlling operation of a remote-control device during playback of a program content stream, comprising:
   at least one computer processor; and
   at least one memory coupled to the at least one computer processor, the at least one memory having computer-executable instructions stored thereon that, when executed by the at least one computer processor, cause the at least one computer processor to:
   receive, at a digital video recorder (DVR) an indication of a selection of a recorded program stored on the DVR for playing from a beginning of the recorded program; and
   in response to the receiving of the indication of the selection of the recorded program for playing:
      automatically determine whether playback of the recorded program is to start at the beginning of the recorded program;
      automatically select a media content segment stored on the DVR to play before playing the recorded program from the beginning of the recorded program based on a determination that the playback of the recorded program is to start at the beginning of the recorded program;
      automatically begin to play the selected media content segment;
      after automatically beginning to play the selected media content segment, receive from a remote-control device, a command to skip or fast forward through all or part of the media content segment; and
      ignore for a predetermined time period, based on media asset metadata stored on the DVR associated with the selected media content segment, all commands received from the remote-control device to skip or fast forward through all or part of the selected media content segment, based on the determination that the playback of the recorded program is to start at the beginning of the recorded program, causing the media content segment to play without skipping or fast forwarding for at least the predetermined time period.

2. The system of claim 1, wherein the media content segment is an advertisement and the predetermined time period is based on a type of advertisement spot indicated by the media asset metadata stored on the DVR.

3. The system of claim 1, wherein the computer-executable instructions, when executed by the at least one computer processor, further cause the at least one computer processor to:
   receive at the DVR the media asset metadata which causes the DVR to select the media content segment stored on the DVR from a plurality of media content segments stored on the DVR based on the media asset metadata and to play the selected media content segment before beginning to play the recorded program from a beginning of the recorded program upon selection of the recorded program stored on the DVR.

4. The system of claim 1 wherein the predetermined time period is one second.

5. The system of claim 1 wherein the predetermined time period is based on an order for insertion of the media content segment to occur at the DVR upon selection of a recorded program stored on the DVR for playing from a beginning of the recorded program.

6. The system of claim 1 wherein the selecting the media content segment includes:
   determining that the media asset metadata includes a service identifier (Service ID) indicating an addressable service of the DVR that plays recorded programs stored on the DVR; and
   selecting the media content segment for playing and the predetermined time period based on a characteristic of the media content segment being associated with the Service ID indicating the addressable service of the DVR that plays recorded programs stored on the DVR.

7. A system for controlling operation of a remote-control device during playback of a program content stream, comprising:
   at least one computer processor; and
   at least one memory coupled to the at least one computer processor, the at least one memory having computer-executable instructions stored thereon that, when executed by the at least one computer processor, cause the at least one computer processor to:
   initiate playback of a program content stream;
   recognize an identifier of a media content segment during playback of the program content stream;
   determine whether the playback of the program content stream started at a beginning of a recorded program;
   automatically select a media content segment to play before playing the recorded program from the beginning of the recorded program based on the determination that playback of the program content stream started at the beginning of the recorded program; and
   in response to the recognition of the identifier, transmit a signal to the remote-control device, wherein the signal causes the remote-control device to ignore at least one function of the remote-control device for a predetermined time period based on the recognition of the identifier of the media content segment and in response to a determination that the playback of the program content stream starts at the beginning of the recorded program.

8. The system of claim 7, wherein the at least one function of the remote-control device which is ignored includes a fast forward function or a skip function.

9. The system of claim 7, wherein the signal causes the remote-control device to ignore all functions of the remote-control device for the predetermined time period in response to the recognition of the identifier of the media content segment.

10. The system of claim 7, wherein the signal includes computer-executable instructions which, when executed by the remote-control device, instruct the remote-control device to stop sending signals regarding the at least one function of the remote control device to the DVR for the predetermined time period.

11. The system of claim 7, wherein the signal includes computer-executable instructions which, when executed by the remote-control device, instruct the remote control device to ignore signals from activation of at least one button on the remote-control device corresponding to the at least one function of the remote-control device.

12. The system of claim 7, wherein the media content segment includes an advertisement.

13. A method for controlling operation of a remote-control device comprising:
receiving, at a media playback device, the media playback device being configured to interact with a remote-control device, a program content stream, the program content stream having a media content segment identifier;
detecting, at the media playback device, a location of the media content segment identifier in the program content stream;
determining whether the media content segment identifier indicates that a media content segment occurs immediately before a beginning of a recorded program in the program content stream;
determining, by the media playback device, when playback of the program content stream reaches the location of the media content segment identifier;
automatically selecting, by the media playback device, a media content segment to play before playing the recorded program from the beginning of the recorded program based on the determination that the media content segment occurs immediately before the beginning of the recorded program in the program content stream; and
ignoring, by the media playback device, at least one function of the remote-control device, for a predetermined time period, when playback of the program content stream reaches the location of the media content segment identifier, in response to a determination that the media content segment identifier indicates that the media content segment occurs immediately before the beginning of the recorded program.

14. The method of claim 13, wherein the at least one function of the remote-control device includes a fast-forward function or a skip function.

15. The method of claim 13, wherein the media playback device ignores all functions of the remote-control device, for a predetermined time period, when playback of the program content stream reaches the location of the media content segment identifier.

16. The method of claim 13, wherein the media playback device ignores the at least one function of the remote-control device by ignoring signals regarding the at least one function of the remote-control device until the predetermined time period has elapsed.

17. The method of claim 13, wherein the media playback device ignores the at least one function of the remote-control device by refusing to accept signals from the remote-control device related to the at least one function of the remote-control device, until the predetermined time period has elapsed.

18. The method of claim 13, wherein the media content segment includes an advertisement.

19. A non-transitory computer-readable storage medium having computer executable instructions stored thereon, that, when executed by at least one computer processor, cause a remote-control device to perform:
receiving a signal from a media playback device that was transmitted from the media playback device when playback of a program content stream reached a location of a media content segment identifier included in a program content stream and in response to a determination by the media playback device that the media content segment identifier indicates that a media content segment occurs immediately before the beginning of a recorded program in the program content stream, wherein the media playback device automatically selects the media content segment to play before playing the recorded program from the beginning of the recorded program based on the determination that the media content segment identifier occurs immediately before the beginning of the recorded program in the program content stream; and
ignoring at least one function of the remote-control device for a predetermined time period based on receiving the signal from the media playback device.

20. The non-transitory computer-readable storage medium of claim 19, wherein the ignored at least one function of the remote-control device includes a fast-forward function or a skip function.

21. The non-transitory computer-readable storage medium of claim 19, wherein the computer-executable instructions, when executed by the at least one computer processor, further causes the remote-control device to perform:
in response to receiving the signal from the media playback device, disabling all functions of the remote-control device for a predetermined time period.

22. The non-transitory computer-readable storage medium of claim 19, wherein the ignoring of the at least one function of the remote-control device includes stopping sending signals related to the at least one function of the remote-control device to the media playback device until the predetermined time period has elapsed.

23. The non-transitory computer-readable storage medium of claim 19, wherein the computer-executable instructions, when executed by the at least one computer processor, further causes the remote-control device to perform:
receiving the signal from the media playback device, after the media playback device determines that the media content segment identifier is located at the beginning of a recorded program included in the program content stream; and
ignoring at least one function of the remote-control device for the predetermined time period in response to receiving the signal from the media playback device.

24. The non-transitory computer-readable storage medium of claim 19, wherein the ignoring at least one function of the remote-control device is performed by instructing the remote-control device to ignore signals from the activation of buttons related to the at least one function of the remote-control device.

25. The non-transitory computer-readable storage medium of claim 19, wherein the media content segment includes an advertisement.

* * * * *